US008844353B2

(12) United States Patent
Hsiao

(10) Patent No.: US 8,844,353 B2
(45) Date of Patent: Sep. 30, 2014

(54) WATER LEVEL SENSOR SWITCH

(75) Inventor: Yu-Ming Hsiao, Taoyuan (TW)

(73) Assignee: Holimay Corporation, Bade, Taoyuan (TW)

( * ) Notice: Subject to any disclaimer, the term of this patent is extended or adjusted under 35 U.S.C. 154(b) by 332 days.

(21) Appl. No.: 13/288,817

(22) Filed: Nov. 3, 2011

(65) Prior Publication Data

US 2013/0047720 A1 Feb. 28, 2013

(30) Foreign Application Priority Data

Aug. 23, 2011 (CN) ...................... 2011 2 0308207 U

(51) Int. Cl.
*G01F 23/32* (2006.01)
*H01H 35/18* (2006.01)

(52) U.S. Cl.
CPC .................................... *H01H 35/18* (2013.01)
USPC ............................................... 73/317; 73/313

(58) Field of Classification Search
USPC .................................................... 73/317, 313
See application file for complete search history.

(56) References Cited

U.S. PATENT DOCUMENTS

| | | | | |
|---|---|---|---|---|
| 2,620,412 | A * | 12/1952 | Ford | 200/56 R |
| 3,087,485 | A * | 4/1963 | Powers | 392/402 |
| 4,017,842 | A * | 4/1977 | Vineyard | 340/533 |
| 4,805,662 | A * | 2/1989 | Moody | 137/312 |
| 4,814,752 | A * | 3/1989 | Lehman | 340/616 |
| 6,362,742 | B1 * | 3/2002 | Serenil, Jr. | 340/625 |
| 6,414,598 | B2 * | 7/2002 | Freill et al. | 340/623 |
| 6,536,277 | B1 * | 3/2003 | Chuang | 73/319 |
| 6,730,865 | B1 * | 5/2004 | Hernandez-Zelaya | 200/84 R |
| 7,710,283 | B1 * | 5/2010 | Cantolino | 340/623 |

* cited by examiner

*Primary Examiner* — Hezron E Williams
*Assistant Examiner* — Rodney T Frank
(74) *Attorney, Agent, or Firm* — Muncy, Geissler, Olds & Lowe, P.C.

(57) ABSTRACT

A water level sensor switch installed in a sidewall of a water tank for detecting its water level is disclosed to include a housing having two bearing portions clamped on two opposite sides of the sidewall of the water tank and a tightening up screw fastened to a vertical wall at a different plane relative to the bearing portions and stop against the sidewall of the water tank to affix the housing to the water tank, a micro switch mounted in the housing, and a float connected to a switching lever of the micro switch outside the housing for biasing the switching lever up and down subject to the level of water in the water tank.

12 Claims, 5 Drawing Sheets

WATER LEVEL SENSOR SWITCH

BACKGROUND OF THE INVENTION

1. Field of the Invention

The present invention relates to sensor switch technology and more particularly, to a water level sensor switch for use in a water tank for detecting the level of water in the water tank.

2. Description of the Related Art

A regular air conditioner system, either of a cooler design or a cold and warm air-conditioning design, generally has a condenser water piping adapted for guiding condensed water to a water tank. Further, a refrigeration equipment, such as freezer or refrigerator, generally uses a water tank to collect condensed water and a water level sensor switch mounted in the water tank for switching on an electric motor to pump water out of the water tank for drainage when the water level reaches a predetermined upper limit position.

A conventional water level sensor switch for use in an air conditioner system or refrigeration equipment is known comprising a micro switch, a swinging frame and a float made of polystyrene foam. The micro switch includes an actuation lever that is coupled to the swinging frame. The float is connected to a hook of the swinging frame. When the level of water in the water tank reaches the predetermined full water level position, the float rises, causing the micro switch to start up the electric motor, and therefore the electric motor starts pumping water. When the level of water in the water tank drops below the predetermined low water level position, the float drops down, causing the micro switch to switch off the electric motor, and therefore the electric motor stops from pumping water.

However, the aforesaid prior art water level sensor switch cannot be firmly secured to the water tank. When the water level reaches the full water level position, the swinging frame may be forced to tilt by the oscillating water surface, affecting the water level sensing operation.

SUMMARY OF THE INVENTION

The present invention has been accomplished to eliminate the drawbacks of the aforesaid prior art designs. It is the main object of the present invention to provide a water level sensor switch, which can be firmly secured to a water tank for detecting the level of water in the water tank accurately.

It is another object of the present invention to provide a water level sensor switch, which allows adjustment of the position of the float to fit different application requirements.

To achieve these and other objects of the present invention, a water level sensor switch installed in a sidewall of a water tank and adapted for detecting the level of water in said water tank, comprising a housing fastened to the sidewall of the water tank, a micro switch mounted in the housing, and a float. The housing comprises two bearing portions arranged on one same plane at the bottom side thereof and kept apart from each other at a predetermined distance, a vertical wall spaced from the two bearing portions at a predetermined distance and at a different plane, and a tightening up screw driven through the vertical wall for stopping against the sidewall of the water tank to affix the housing to the water tank after the two bearing portions have been clamped on two opposite sides of the sidewall of the water tank. The micro switch comprises a switch body mounted in the housing and a switching lever pivotally coupled to the switch body and extending out of the housing and biasable up and down relative to the housing. The float is connected to one end of the switching lever outside the housing.

During installation, the two bearing portions of the housing are clamped on two opposite sides of the sidewall of the water tank, and then the tightening up screw is fastened tight and stopped against the sidewall of the water tank, achieving three-point fixation, and therefore the water level sensor switch is firmly secured to the water tank for detecting the level of water in the water tank accurately.

Further, the housing comprises a front cover shell, a rear cover shell fastened to the front cover shell, and an accommodation chamber surrounded by the front cover shell and the ear cover shell.

Further, the rear cover shell comprises three locating pins numbered from $1^{st}$ through $3^{rd}$ and suspending in the accommodation chamber. The switch body of the micro switch comprises two locating holes adapted for receiving the first two locating pins or the last two locating pins of the rear cover shell selectively so that the float can be held in one of two alternative positions subject to different application requirements.

Further, the rear cover shell comprises two hook rods suspending in the accommodation chamber for hooking up the switch body of the micro switch, enhancing micro switch mounting stability.

Further, the front cover shell comprises a rib. Further, the rear cover shell comprises a top wall covered by the front cover shell, and a groove located on an end edge of the top wall for the passing of the rib. The rib can be a tapered rib having a diameter increasing gradually from the bottom side of the front cover shell toward the top side thereof.

Further, the front cover shell comprises a pressure strip for stopping against the switch body of the micro switch. Further, the rear cover shell comprises a top wall covered by the front cover shell, and a notch located on an end edge of the top wall for the passing of the pressure strip.

Further, an anti-slip member is disposed in the housing and set between the vertical wall and each of the two bearing portions of the housing for stopping against the sidewall of the water tank to avoid slipping. Further, the anti-slip member can be made of sponge or rubber.

Other advantages and features of the present invention will be fully understood by reference to the following specification in conjunction with the accompanying drawings, in which like reference signs denote like components of structure.

DETAILED DESCRIPTION OF THE INVENTION

It is to be noted that the directional adjectives used in the specification, such as, front, rear, up, down, top, bottom and the likes are based on drawing directions.

Figure 1:
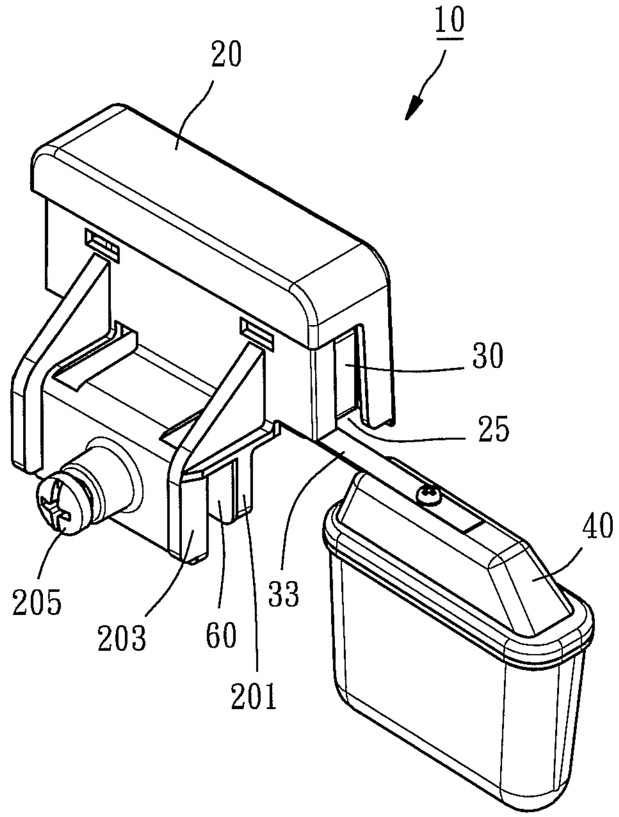
FIG. 1 is an elevational view of a water level sensor switch in accordance with the present invention.
Figure 2:
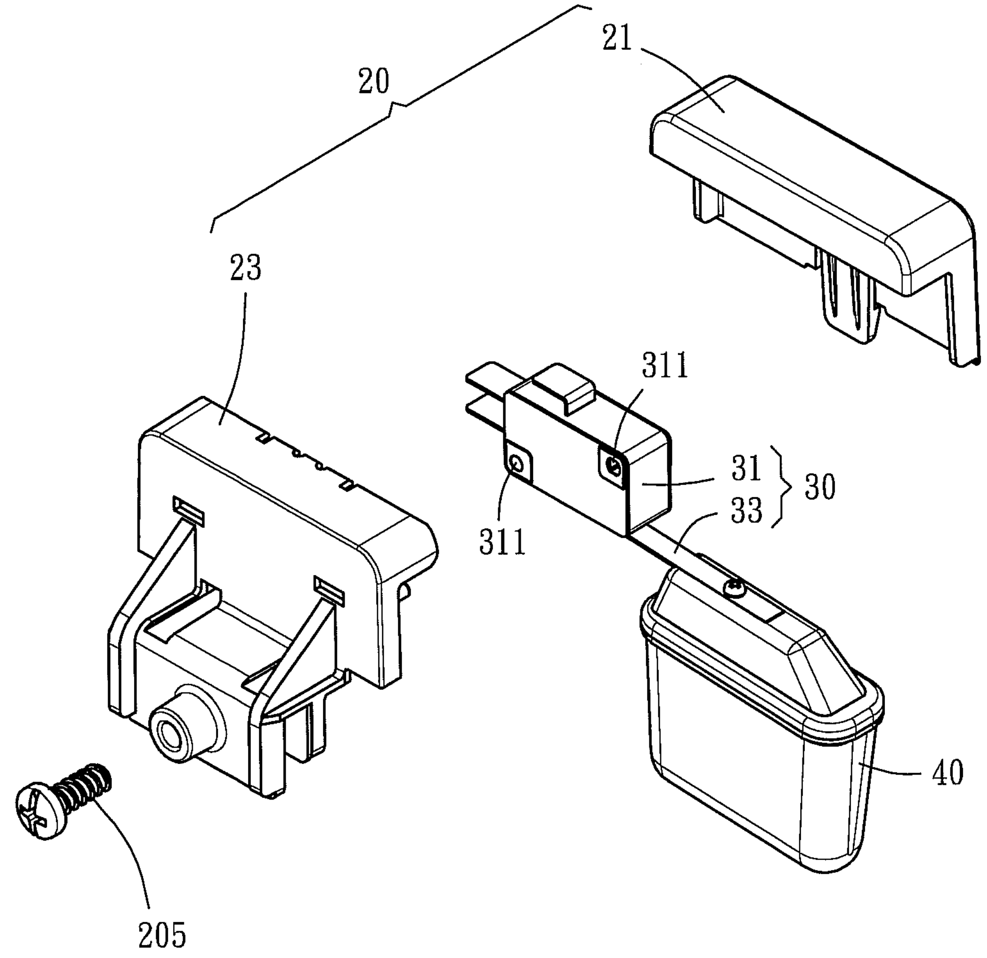
FIG. 2 is an exploded view of the water level sensor switch in accordance with the present invention.

At first, please refer to FIG. 1 and FIG. 2. a water level sensor switch 10 in accordance with the present invention comprises a housing 20, a micro switch 30 mounted inside the housing 20, and a float 40 connected to the micro switch 30.

Figure 4:
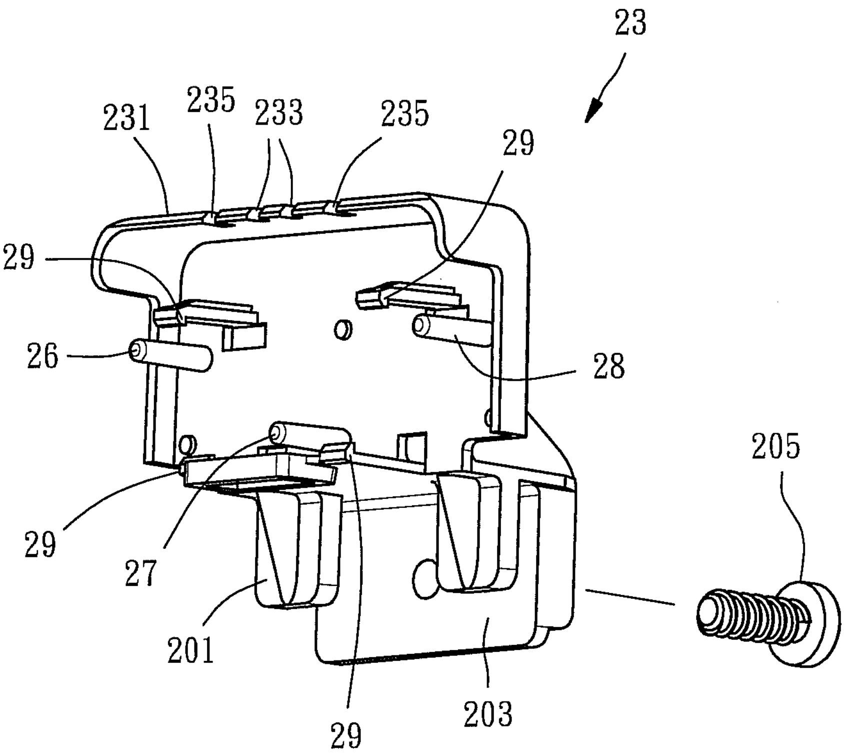
FIG. 4 is an elevational view of a part of the present invention, illustrating the configuration of the rear cover shell.

As shown in FIG. 1 and FIG. 4, the housing 20 comprises two bearing portions 201 outwardly downwardly extended from the outer surface thereof at one side, a vertical wall 203 kept away from the bearing portions 201 at a predetermined distance and at a different elevation, and a tightening up screw 205 driven through the vertical wall 203. In this embodiment, these two bearing portions 201 are respectively made in the form of a lug. However, this design is not a limitation. For example, these two bearing portions 201 can be two raised portions located on an extension wall that extends downwardly from the outer surface of the housing 20.

Referring to FIG. 2 again, the micro switch 30 comprises a switch body 31 accommodated in the housing 20, and a switching lever 33 extended from the switch body 31 to the outside of the housing 20 and biasable up and down relative to the switch body 31.

The float 40 can be, for example, but not limited to, a hollow plastic cylinder floatable on water. The float 40 is connected with the switching lever 33 in such a manner that the switching lever 33 is biasable up and down subject to the elevation of the float 40.

Figure 7:
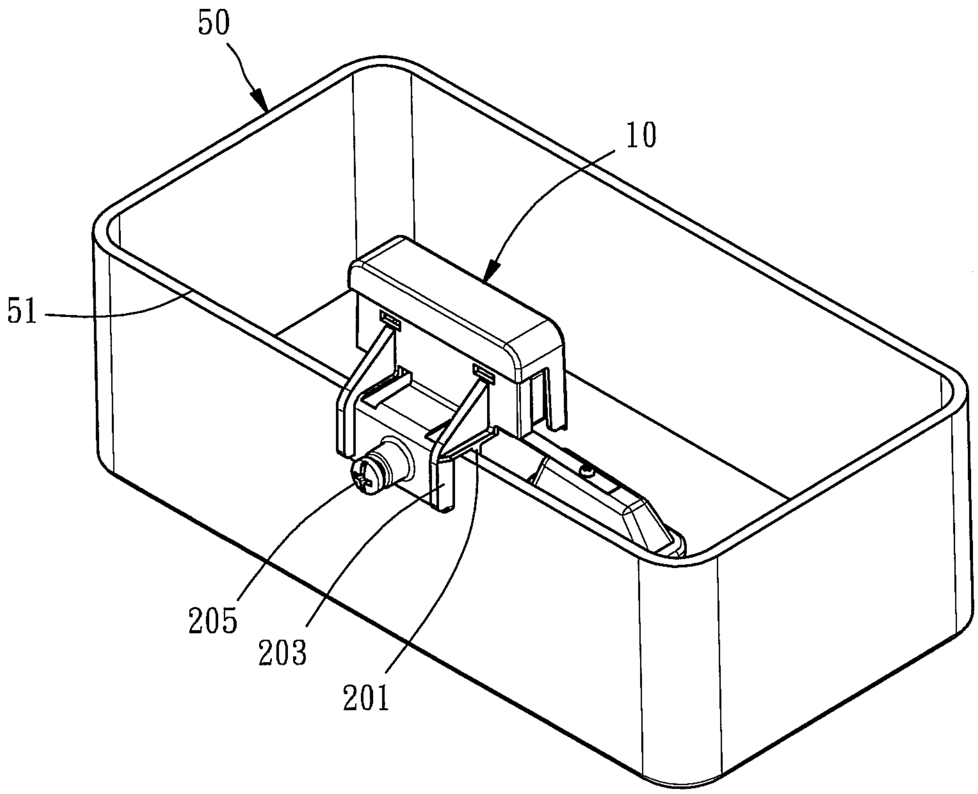
FIG. 7 is a schematic elevational view of the present invention, illustrating the water level sensor switch installed in a sidewall of a water tank.

During application, as shown in FIG. 7, the water level sensor switch 10 is installed in a water tank 50 by: clamping the two bearing portions 201 and the vertical wall 203 on two opposing sides of one sidewall 51 of the water tank 50 and then fastening tight the tightening up screw 205 to stop the tip of the tightening up screw 205 against the sidewall 51 of the water tank 50. Thus, the water level sensor switch 10 is firmly secured to the water tank 50 by three-point fixation and can accurately detect the level of water in the water tank 50 without vibration.

Referring to FIGS. 1 and 4 again, the water level sensor switch 10 further comprises two anti -slip members 60 that are respectively mounted at the two bearing portions 201 in this embodiment for positive stoppage against the sidewall 51 of the water tank 50 to prevent displacement of the housing 20 relative to the water tank 50. However, the quantity and installation location of the anti-slip members 60 are not limited to this example. For example, in an alternate form, the anti-slip member(s) can be arranged around the bearing portions 201 and the vertical wall 203 or can include only one anti-slip member 60 mounted on one bearing portion 201. Further, the anti-slip members 60 can be, but not limited to, sponge or rubber.

Referring to FIG. 2, the housing 20 consists of a front cover shell 21 and a rear cover shell 23. The front cover shell 21 and the rear cover shell 23 define an accommodation chamber 25.

Figure 3:
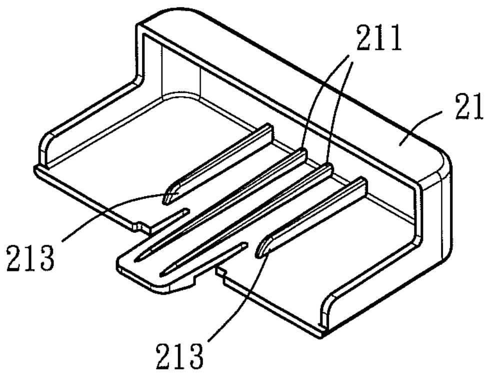
FIG. 3 is an elevational view of a part of the present invention, illustrating the configuration of the front cover shell.

Referring to FIG. 3, the front cover shell 21 comprises two tapered ribs 211 arranged in parallel that have a diameter gradually reducing in direction from the bottom side toward the top side, and two pressure strips 213 respectively disposed at an outer side relative to the tapered ribs 211.

Referring to FIG. 4, the rear cover shell 23 comprises a top wall 231. The top wall 231 has two grooves 233 and two notches 235 on one end thereof for the passing of the two tapered ribs 211 and the two pressure strips 213 respectively. When assembling the front cover shell 21 and the rear cover shell 23, the tapered ribs 211 and the grooves 233 facilitate quick positioning and installation. By means of pressing the pressure strips 213 against the micro switch 30, the micro switch 30 is firmly held in the housing 20. It is to be understood that the quantity and configuration of the pressure strips 213 are not limited the aforesaid design. Any quantity that achieves quick positioning is acceptable. The tapered design simply facilitates insertion of the ribs through the grooves 233.

Referring to FIG. 4 again, the rear cover shell 23 further comprises three locating pins numbered 1$^{st}$ through 3$^{rd}$ 26~28. The 2$^{nd}$ locating pin 27 is disposed in a diagonal manner relative to the 1$^{st}$ locating pin 26 and the 3$^{rd}$ locating pin 28. Further, multiple hook rods 29 are located on the inner surface of the rear cover shell 23.

Figure 5:
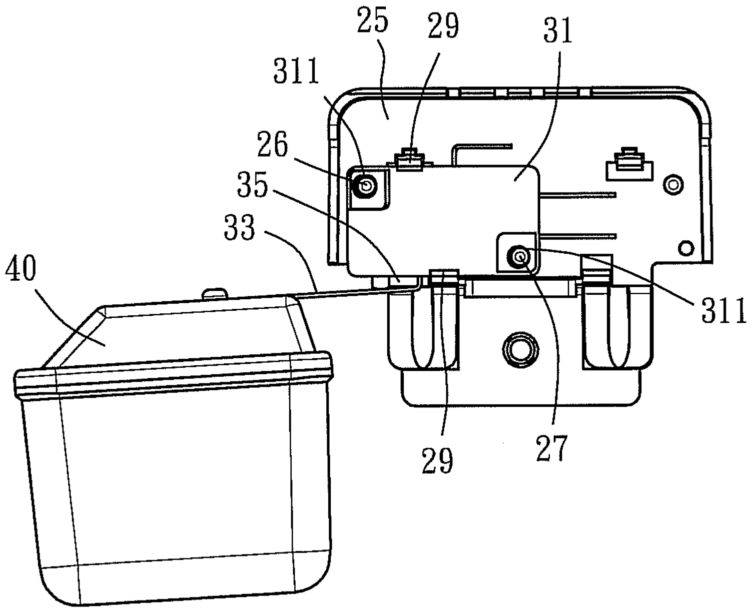
FIG. 5 is a schematic front view of the present invention, illustrating one positioning status of the float and the relationship between the float and the micro switch (the front cover shell of the housing excluded).
Figure 6:
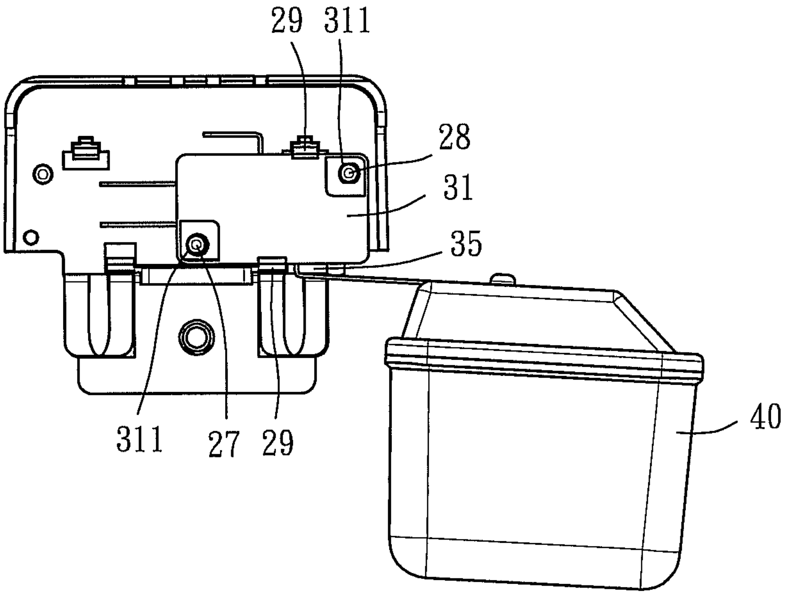
FIG. 6 is similar to FIG. 5, illustrating another positioning status of the float.

Referring to FIGS. 5 and 6 and FIG. 2 again, the switch body 31 of the micro switch 30 has two locating holes 311 respectively disposed in two diagonal corners thereof for receiving the locating pins 26~28 selectively.

During installation, as shown in FIGS. 5 and 6, the switch body 31 of the micro switch 30 is set in the accommodation chamber 25 and hooked in place by the two hook rods 29 to hold the switching lever 33 outside the housing 20. At this time, the switching lever 33 has its one end pivotally connected to the switch body 31 and its other end connected to the float 40. During application, the switching lever 33 will be moved up and down with the float 40 subject to the level of water in the water tank 50 to trigger or not to trigger the micro switch 30. Further, by means of selectively plugging the 1$^{st}$ and 2$^{nd}$ locating pins 26 and 27 or the 2$^{nd}$ and 3$^{rd}$ locating pins 27 and 28 into the locating holes 311 of the switch body 31, the position of the float 40 is relatively changed to fit different application requirements.

The water level sensor switch 10 is practical for use in an air conditioning system or refrigeration system. After installation of the water level sensor switch 10 in the water tank 50 of an air conditioning system or refrigeration system, the float 40 will float on the water in the water tank 50. When the water level elevates to about the full water level (upper limit position), the float 40 rises to carry the switching lever 33 upwards, causing the micro switch 30 to trigger the actuation button 35 in starting up an electric motor (not shown) to pump water. When the water level in the water tank 50 is lowered to about the predetermined low water level (lower limit position), the float 40 drops down to carry the switching lever 33 downwards, thereby releasing the actuation button 35, and therefore the electric motor is off and stopped from pumping water. The invention can also be used in a water reservoir 50. When the float rises 40 subject to an increase in the water level, the switching lever 33 is turned upwards to trigger the actuation button 35, stopping an electric motor (not shown) from pumping water into the water reservoir 50.

In conclusion, by means of stopping the tightening up screw 203 against the sidewall of the water tank 50, the two bearing portions 201 and the tightening up screw 203 establish a three-point fixation mechanism to firmly secure the water level sensor switch 10 to the water tank 50. Thus, the water level sensor switch 10 will not be forced to vibration by the water level during operation and can accurately detect the level of water in the water tank 50. Further, the position of the float 40 of the by the water level sensor switch 10 can be adjusted to fit different application requirements.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A water level sensor switch installed in a sidewall of a water tank and adapted for detecting the level of water in said water tank, the water level sensor switch comprising:

a housing comprising two bearing portions arranged on one same plane at a bottom side thereof and kept apart from each other by a gap having a predetermined distance, a vertical wall spaced from said two bearing portions at a predetermined distance and at a different plane, and a tightening up screw driven through said vertical wall and toward said gap, said bearing portions and said vertical wall being part of a rear cover shell;

a micro switch comprising a switch body mounted in said housing and a switching lever pivotally coupled to said switch body and extending out of said housing and biasable up and down relative to said housing; and a float connected to one end of said switching lever outside said housing.

2. The water level sensor switch as claimed in claim 1, wherein said housing comprises a front cover shell, a rear cover shell fastened to said front cover shell, and an accommodation chamber surrounded by said front cover shell and said rear cover shell.

3. The water level sensor switch as claimed in claim 2, wherein said rear cover shell comprises two locating pins suspending in said accommodation chamber; said switch body of said micro switch comprises two locating holes adapted for receiving said locating pins respectively.

4. The water level sensor switch as claimed in claim 3, wherein said locating holes of said switch body of said micro switch are disposed in a diagonal relationship.

5. The water level sensor switch as claimed in claim 2, wherein said rear cover shell comprises a first locating pin, a second locating pin and a third locating pin, said second locating pin being disposed in a diagonal manner relative to said first locating pin and said third locating pin; said switch body of said micro switch comprises two locating holes adapted for selectively receiving said first locating pin and said second locating pin, or said second locating pin and said third locating pin.

6. The water level sensor switch as claimed in claim 3, wherein said rear cover shell comprises two hook rods suspending in said accommodation chamber for hooking up said switch body of said micro switch.

7. The water level sensor switch as claimed in claim 2, wherein said front cover shell comprises a rib; said rear cover shell comprises a top wall covered by said front cover shell, and a groove located on an end edge of said top wall for the passing of said rib.

8. The water level sensor switch as claimed in claim 7, wherein said rib is a tapered rib having a diameter increasing gradually from a bottom side of said front cover shell toward a top side thereof.

9. The water level sensor switch as claimed in claim 2, wherein said front cover shell comprises a pressure strip for stopping against said switch body of said micro switch; said rear cover shell comprises a top wall covered by said front cover shell, and a notch located on an end edge of said top wall for the passing of said pressure strip.

10. The water level sensor switch as claimed in claim 1, wherein said housing further comprises an anti-slip member set between said vertical wall and at least one of said two bearing portions.

11. The water level sensor switch as claimed in claim 10, wherein said anti-slip member is selected from the group of sponge and rubber.

12. The water level sensor switch as claimed in claim 1, wherein said two bearing portions are lugs disposed in a parallel manner relative to said vertical wall.

* * * * *